US006045188A

United States Patent [19]

Schooler

[11] Patent Number: 6,045,188

[45] Date of Patent: Apr. 4, 2000

[54] SEAT BACK LOCK

[76] Inventor: Paul T. Schooler, 16285 Erin, Fraser, Mich. 48026

[21] Appl. No.: 09/212,751

[22] Filed: Dec. 16, 1998

[51] Int. Cl.[7] .................................................... B60N 2/02

[52] U.S. Cl. ............................... 297/362.14; 297/362.12; 297/376; 297/375; 188/67

[58] Field of Search ......................... 297/362.12, 362.14, 297/376, 375; 70/261; 188/67; 403/348, 350; 285/391

[56] References Cited

U.S. PATENT DOCUMENTS

| | | | |
|---|---|---|---|
| 55,354 | 6/1866 | Osgood | 285/391 |
| 763,210 | 6/1904 | Schwamberger | 285/391 |
| 1,440,801 | 1/1923 | Shoemaker | 403/348 |
| 3,876,248 | 4/1975 | Gillentine | 297/375 |
| 4,457,406 | 7/1984 | Porter | 188/67 |
| 4,685,734 | 8/1987 | Brandoli | 297/362.12 |
| 4,799,734 | 1/1989 | Periou | 297/362.14 |
| 4,881,775 | 11/1989 | Rees | 297/362.14 |
| 4,898,424 | 2/1990 | Bell | 297/367 X |
| 5,131,115 | 7/1992 | Sarto | 16/82 X |
| 5,299,853 | 4/1994 | Griswold et al. | 297/362.14 |
| 5,320,413 | 6/1994 | Griswold et al. | 297/362.12 |
| 5,556,165 | 9/1996 | Pickles | 297/362.14 |
| 5,689,995 | 11/1997 | Heckel, Jr. | 297/362.14 X |
| 5,692,856 | 12/1997 | Newman, Jr. et al. | 403/352 X |
| 5,775,776 | 7/1998 | Schooler et al. | 297/375 |
| 5,778,733 | 7/1998 | Stringer | 74/527 X |
| 5,794,470 | 8/1998 | Stringer | 70/261 |
| 5,884,970 | 3/1999 | Howard | 297/362.14 |
| 5,947,560 | 9/1999 | Chen | 297/362.12 |
| 5,984,412 | 11/1999 | Magyar | 297/362.12 |

FOREIGN PATENT DOCUMENTS

| | | | |
|---|---|---|---|
| 2057986 | 6/1992 | Canada | 297/362.14 |

*Primary Examiner*—Harry C. Kim
*Assistant Examiner*—Brian H. Buck
*Attorney, Agent, or Firm*—Howard & Howard

[57] ABSTRACT

A system for mounting a seat back relative to a seat bottom includes a rod having circumferentially spaced threaded and non-threaded portions. The non-threaded portions have a smaller diameter than the threaded portions. The rod extends through a bore in a lock ring. The lock ring bore has threaded and non-threaded portions. The threaded portions of the ring have a smaller diameter than the non-threaded portions. The lock ring is rotatable between a locked position at which its threaded portions are aligned with the threaded portions on the rod. At this position, the rod cannot move. The rod is fixed to a seat back pivot bracket, and when the rod is fixed, the seat back is prevented from pivoting relative to a seat bottom. However, when the locked member is rotated such that its non-threaded portions are aligned with the threaded portions on the rod, the rod can move. At this position the seat back can pivot relative to the seat bottom. The same locking mechanism is used as a seat track in a separate embodiment.

9 Claims, 2 Drawing Sheets

35 40 41 44 42 32 49 50 48 36 44 46 48 38

SEAT BACK LOCK

BACKGROUND OF THE INVENTION

This invention relates to a simplified and reliable method of locking a seat back against pivoting relative to a seat bottom. The same mechanism is useful as a replacement to a seat track.

Seat backs are typically provided to be pivotally mounted on a seat bottom in modern vehicles. Typically, the seat back must be allowed to pivot relative to the seat bottom to adjust the relative position, and further, to allow entrance into the rear compartment of a two-door vehicle.

On the other hand, standards require that the seat back not move relative to the seat bottom in a vehicle collision. To provide a system which allows easy pivoting of the seat back relative to the seat bottom, while still providing sufficient holding strength against pivoting, has provided challenges in the prior art.

Most systems for locking a seat back relative to a seat bottom have been very complex and comprise a number of parts. These systems have not always provided sufficient holding force. Thus, it would be desirable to improve upon the systems for locking a seat back relative to a seat bottom.

Seat tracks are typically used to guide a seat for forward and rear movement. In general, the tracks are complex.

SUMMARY OF THE INVENTION

In a disclosed embodiment of this invention, a rod extends to a bracket mounted to the seat back. A pivot point between the bracket and the seat bottom is maintained locked if the rod is constrained against axial movement. A lock system locks the rod against axial movement. The inventive lock system includes a rotating lock member which is moveable between two positions. The rod and the lock member each have enlarged and smaller portions at circumferentially spaced locations. The lock member is moveable to a position wherein its enlarged portions are circumferentially aligned with the enlarged portions on the rod. In this location, the lock member locks the rod. The lock member is rotatable such that its smaller portion is circumferentially aligned with the enlarged portion on the rod. At this position, the rod is allowed to move. Thus, an operator may move the rotating lock member between a locked and unlocked position. In addition, this system is very simple, and does not include many moving parts. However, a very strong holding force is provided.

In a preferred embodiment, the enlarged portion of the rod includes threads at an outer periphery. The smaller portion of the rod is formed by removing material on circumferentially spaced areas on each side of two threaded enlarged portions. The lock member is preferably provided with its smaller portions having removed threads and its larger portions having threads extending radially inwardly from an inner bore. When the threads on the lock member are circumferentially aligned with the threads on the rod, the rod is constrained against movement. However, when the lock member is rotated such that its non-threaded portion is aligned with the threaded portion on the rod, the rod can move.

In a preferred embodiment, the rod and the locking member are mounted within an outer tube. The outer tube is provided with a slot. A pin is fixed into the lock member. The pin extends through the slot. The slot allows the pin to be moved between a locked position and a non-locked position. As the pin moves, it moves the lock member such that the rod can be released for axial movement.

Further, the same locking mechanism can be utilized to replace the last track.

These and other features of the present invention can be best understood from the following specification and drawings, the following of which is a brief description.

DETAILED DESCRIPTION

Figure 1:
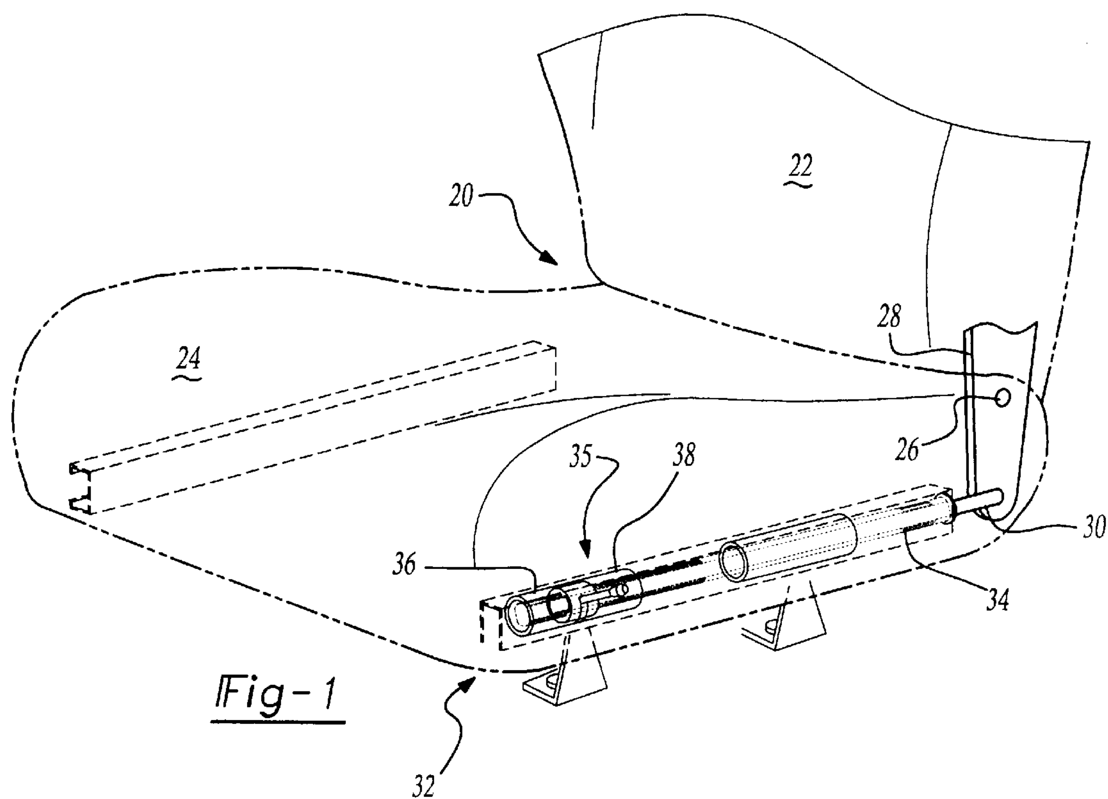
FIG. 1 is a schematic view showing a seat.

As shown in FIG. 1, seat 20 includes a seat back 22 connected to a seat bottom 24. As known, a pivot point 26 is formed between the seat bottom 24 and a bracket 28 on the seat back 22. A rod 30 is pivotally connected to the bracket 28. The rod is held at a predetermined axial position or selectively released to prevent or allow pivoting of the seat back 22 relative to the seat bottom 24.

A forward portion 32 of the rod 30 is included in a locking assembly 35. A spring 34 biases the lock member rod 30 away from the remainder of the lock mechanism 35 such that when the lock is released, the seat back 22 is driven to pivot relative to the seat bottom 24. A locking tube 36 is included in the lock mechanism 35. A lock ring 38 is received within the tube 36. A pin 40 serves to move the lock ring 38 relative to the rod portion 32 to allow unlocking and movement of rod 30.

Figure 2A:
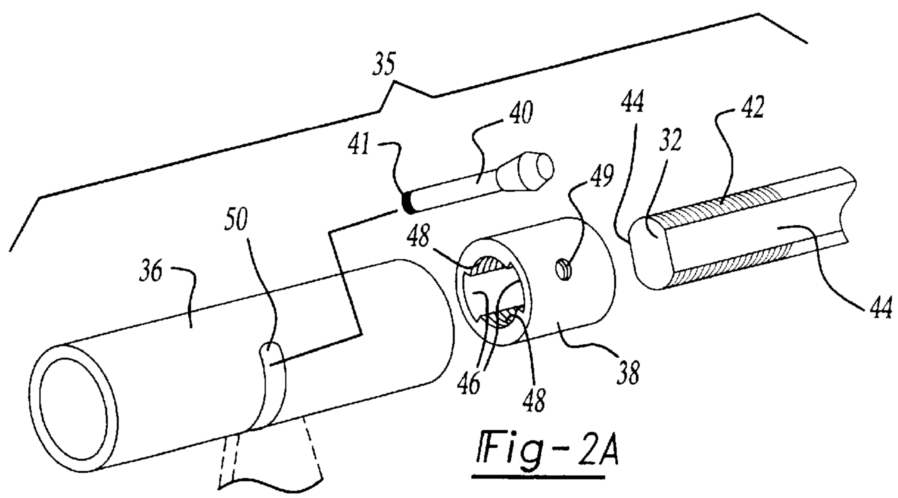
FIG. 2*a* is an exploded view of components of a lock mechanism.

As shown in FIG. 2A, the pin 40 includes threads 41. The pin is received in a hole 49 in the lock ring 38.

The forward portion 32 includes threaded portions 42 with circumferentially interspaced non-threaded portions 44. As can be appreciated, the non-threaded portions could be cut off from the threaded portions 42 after the threads are formed on rod portion 32.

The ring 38 has similar non-threaded portions 46 and threaded portions 48 extending inwardly from an inner bore.

The tube 36 has a slot 50, and the pin 40 extends through the slot 50 and is received in the hole 49 in ring 38.

Figure 2B:
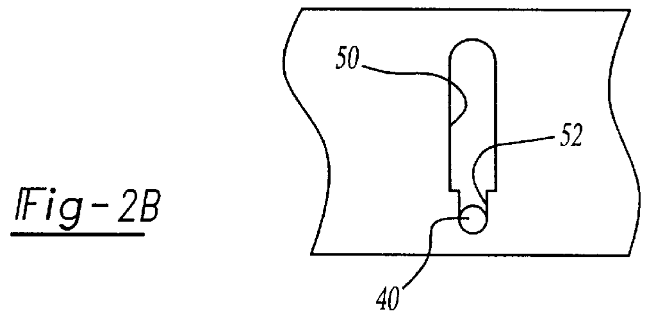
FIG. 2*b* is a view of one portion of the lock mechanism.

As shown in FIG. 2B, the slot 50 has a smaller lower portion 52. The pin 40 is dimensioned so as to be wedged into the smaller portion 52. Thus, the pin 40 will tend to be held at the lower portion 52 when it is moved to that position.

Figure 3:
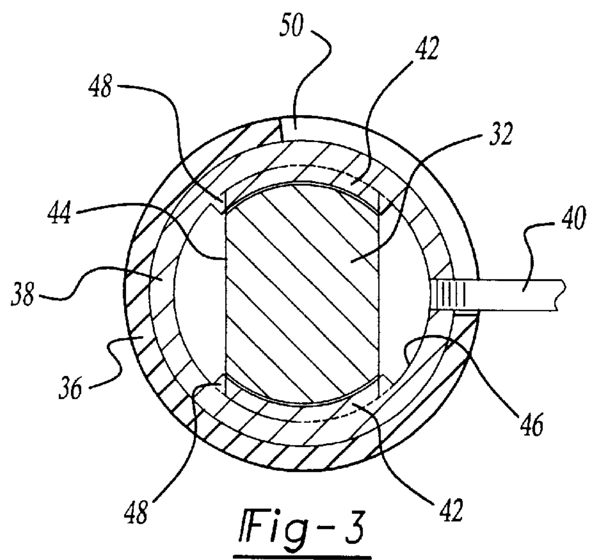
FIG. 3 shows components in a locked position.

FIG. 3 shows the components in the locked position. The pin 40 is held at its lower position. In this position, the threaded portions 48 are circumferentially aligned with the threaded portions 42 on the forward portion 32. The threads thus interfit with each other and there is a large amount of contact and holding force between the ring 38 and the rod portion 32. The rod is thus securely held.

Figure 4:
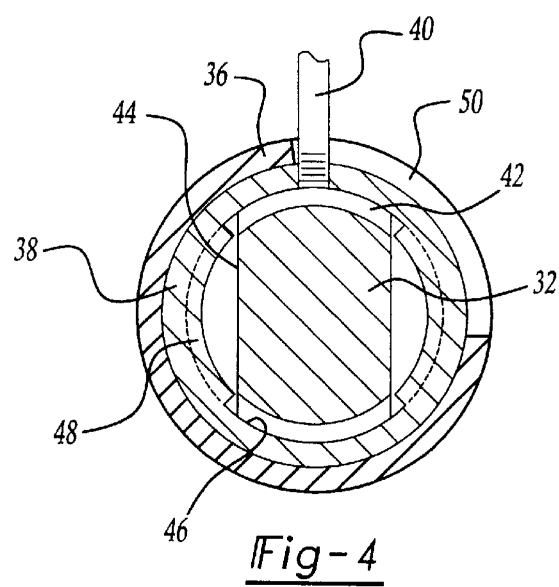
FIG. 4 shows the components having been moved to an unlocked position.

As shown in FIG. 4, the pin 40 can rotate to rotate the lock ring 38. With this rotation, the non-threaded portion 46 of the lock ring 38 is now aligned with the threaded portions 42 of the forward portion 32. In this position, the rod 30 can move axially within the bore in the lock ring 38. This allows the seat back 22 to pivot relative to the seat bottom.

Figure 5:
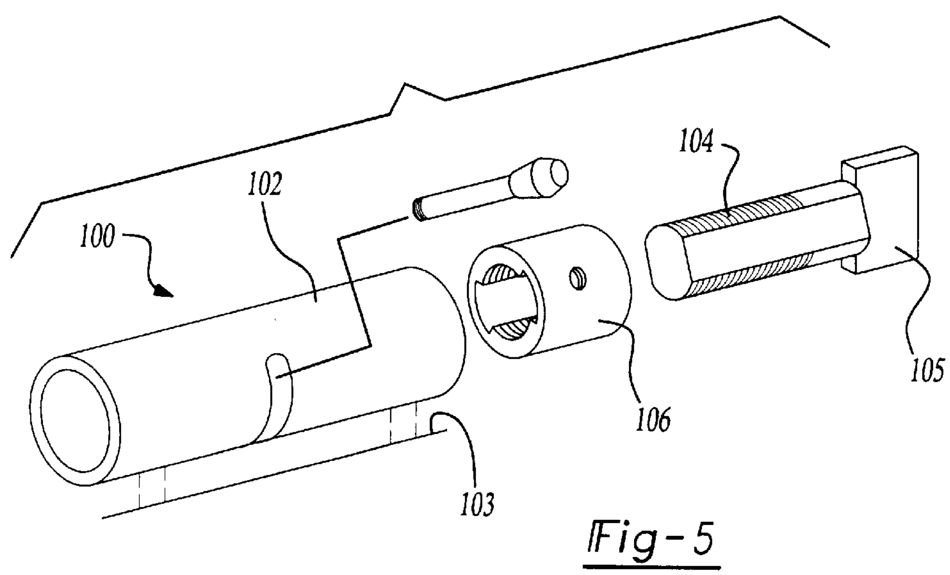
FIG. 5 shows the locking mechanism schematically employed as a seat track.

FIG. 5 shows an embodiment 100 wherein tube 102 is fixed to a vehicle floor 103 and rod 104 is fixed to a seat bottom 105, shown schematically. The lock ring 106 selectively locks the two. The locking mechanism can be utilized in this arrangement to replace a seat track and allow forward and rear movement of the seat A preferred embodiment of this invention has been disclosed; however, a worker of ordinary skill in this art would recognize that modifications come within the scope of this invention. For that reason, the following claims should be studied to determine the true scope and content of this invention.

What is claimed is:

1. A vehicle seat comprising: a bracket mounted to a seat back, said bracket attached to a portion of a seat bottom;

a rod extending along an axis and connected to said bracket, said rod having circumferentially spaced greater diameter portions and circumferentially spaced smaller diameter portions, with said smaller diameter portions being circumferentially between said greater diameter portions;

a lock ring rotatable about said axis said rod extending through an inner bore in said lock ring, and said inner bore having smaller diameter portions extending radially inwardly and circumferentially spaced from other portions of said bore which have a greater diameter; and said lock ring being rotatable about said axis between a locked position at which said smaller diameter portions on said inner bore are aligned with said greater diameter portions on said rod, and said rod is constrained against movement, and said lock ring being rotatable to an unlocked position such that said greater diameter portions of said inner bore are aligned with said greater diameter portions on said rod such that said rod is movable within said bore.

2. A vehicle seat as recited in claim 1, wherein said greater diameter portions on said rod and said smaller diameter portions on said lock ring are threaded portions.

3. A vehicle seat as recited in claim 1, wherein a pin is mounted to said lock ring to allow said lock ring to be moved between said locked and unlocked positions.

4. A vehicle seat as recited in claim 3, wherein a tube surrounds said lock ring and said rod, said tube having a slot for allowing limited movement of said pin, said pin extending through said slot, such that said pin may be rotated to rotate said lock ring between said locked and unlocked positions.

5. A vehicle seat as recited in claim 4, wherein said slot has a greater thickness portion and a smaller thickness portion, and said pin is wedgeable into said smaller thickness portion, and will be held at said smaller thickness portion to retain said lock ring at said locked position.

6. A vehicle seat as recited in claim 1, wherein said rod is constrained against rotation, but selectively allowed to move axially.

7. A lock system for a vehicle seat comprising: a rod extending along an axis and connected to a portion of a seat, said rod having circumferentially spaced greater diameter threaded portions and smaller diameter non-threaded portions;

a lock ring rotatable about said axis, said rod extending through an inner bore in said lock ring, and said inner bore having smaller diameter threaded portions extending radially inwardly and circumferentially spaced from larger diameter threaded portions;

a tube surrounding said rod and said lock ring, said tube having a slot, said tube being fixed relative to said seat portion; and said lock ring being rotatable about said axis between a locked position at which said smaller diameter portions in said inner bore are aligned with said greater diameter portions on said rod, and said rod is constrained against movement, and said lock ring being rotatable such that said larger diameter portions of said inner bore are aligned with said greater diameter portions on said rod such that said rod is movable within said bore, a pin extending through said slot and into said lock ring, said pin facilitating rotation of said lock ring.

8. A lock system as recited in claim 7, wherein said seat portion is a seat back and said tube is fixed to a seat bottom.

9. A lock system as recited in claim 7, wherein said seat portion is a seat bottom, and said tube is fixed to a vehicle floor.

* * * * *